Patented Jan. 16, 1940

2,187,393

UNITED STATES PATENT OFFICE 2,187,393

PRODUCTION OF CARBON DISULPHIDE

Martin de Simó, Piedmont, Calif., assignor to Shell Development Company, San Francisco, Calif., a corporation of Delaware No Drawing. Application February 1, 1938, Serial No. 188,099

16 Claims. (Cl. 23—206)

This invention relates to an improved process for the production of carbon disulphide. More particularly it relates to a catalytic process for the production of carbon disulphide from organic compounds and sulphur.

The objects of the invention are to provide a process affording superior yields of carbon disulphide based on the sulphur used, to provide a process affording a residual gas of lower hydrogen sulphide content from which pure hydrogen may be more easily recovered, to provide a process affording a higher concentration of carbon disulphide in the reaction product and thereby affording considerable economies in condensing the carbon disulphide, to provide a process affording a minimum of corrosion, to provide a more economical process which may be executed continuously, and other objects which will be apparent in the following description.

The conventional method for the production of carbon disulphide is to react sulphur and charcoal in an electric furnace. In order to avoid the use of relatively expensive charcoal and to utilize waste hydrocarbons, it has been proposed to produce carbon disulphide according to the reaction $CH_4 + 2H_2S \rightleftharpoons CS_2 + 4H_2$. At moderate temperatures the equilibrium of this reaction is unfavorable allowing only about 67% conversion at 1100° C. The actual yields are, however, much lower due to side reactions such as the decomposition of $H_2S$, hydrocarbons, etc. While at more elevated temperatures, affording a more favorable equilibrium, the yields may be somewhat increased, they do not approach that of theory and are usually about 55% or less.

Besides the cost and corrosion difficulties created by the high temperature operation, another disadvantage is the difficulty encountered in condensing the carbon disulphide from the reacted gases. It is seen that, even assuming 100% conversion, the partial pressure of carbon disulphide in the reacted gases is only ⅕ atmospheric (at one atm. pressure). Since the vapor pressure of carbon disulphide at room temperature is about ⅓ atm. and at 0° C. about ⅙ atm., it is evident that very efficient condensers operated at very low temperatures must be employed.

In the present process I react organic compounds with sulphur vapor. The reaction, when methane, the simplest volatile organic compound, is used, is $CH_4 + 2S \rightleftharpoons CS_2 + 2H_2$. The reaction is by no means equivalent to the reaction using hydrogen sulphide. The equilibrium, for example, is much more favorable allowing about 74% conversion at only 500° C. Moreover, if 100% conversion is again assumed, the partial pressure of the carbon disulphide in the reacted gases is ⅓ atm. This greater concentration of carbon disulphide in the reacted gases allows substantial economies in condensation to be realized. Sulphur is, moreover, considerably cheaper than hydrogen sulphide.

Although this reaction, likewise, due to side reactions does not afford the yield of carbon disulphide expected from the equilibrium data, I have found that superior yields of carbon disulphide may be produced by this more advantageous process if the reaction is executed in the presence of a suitable catalyst and in the proper temperature range.

According to the present process, I pass a mixture of the vapors of sulphur and an organic compound in the desired proportions and at such a rate over a suitable catalyst maintained at a temperature of from about 750° C. to about 1100° C. that the reaction time is from 0.08 to 60 seconds, and recover the carbon disulphide from the gaseous reaction products.

I have found metal sulphides very efficient for catalyzing the reaction. The sulphides of elements of the 8th group of the periodic system, the sulphides of the metals of the copper family (Cu, Ag, Au), molybdenum sulphide and manganese sulphide are very effective. Other sulphides, such as chromium, titanium, vanadium, zinc, etc., may be used. The activity of the catalyst may be enhanced somewhat by the addition thereto of a small amount of a promoter such as thorium oxide, chromium oxide, cerium oxide, and the like. These catalysts, unlike other substances which might be expected to catalyze the reaction are not appreciably coated with carbon during the reaction and thereby rendered inactive. Such substances as deposit carbon are quickly robbed of any catalytic influence that they might possess since carbon surfaces are practically inactive. The catalyst may be used per se or may be supported upon a suitable carrier, the latter method being, of course, preferable when using expensive catalysts. For example, $Ag_2S$ may be supported upon pumice, asbestos, clay chips, porcelain chips, silica chips, etc., to form an effective catalyst.

The optimum temperature to be employed depends upon the catalyst used, upon whether or not the catalyst is promoted, and upon the contact time, and may vary considerably. I have found that the process is most economical when operated in the temperature range of from about 750° C. to about 1100° C. and preferably from about 800° C. to about 1000° C. At 750° C. a 50% conversion of sulphur to carbon disulphide may be generally obtained, and this, I consider, is about the minimum yield for economic operation. At temperatures below 750° C. the conversion is generally less than 50% and another reaction ($CH_4+4S \rightarrow CS_2+2H_2S$) predominates.

In the presence of the above mentioned catalysts, the reaction proceeds at a rapid rate. For example, I have been able to produce complete reaction with reaction times as low as 0.08 second. With slightly longer reaction times the conversion may be raised slightly but this advantage is more than offset by the increased production at the shorter reaction times. In general, the reaction time is most economically held at from about 0.05 to 20 seconds but may be as high as 60 seconds or higher.

Although, according to the present invention, the sulphur undergoes complete reaction (substantially no uncombined sulphur is found in the reaction products) the yield is not 100% as might be expected from thermo dynamic consideration of the reaction. This is chiefly due to a side reaction which converts a portion of the sulphur into hydrogen sulphide according to the equation $CH_4+4S \rightarrow CS_2+2H_2S$. Under the preferred conditions for execution of my process, the hydrogen suphide formed is kept at a minimum and as a consequence the reacted gases after removing the carbon disulphide may be more easily worked up for hydrogen. Thus, for example, under favorable conditions, I have been able to reduce the amount of sulphur going to hydrogen sulphide to less than 20%, a figure considerably lower than any hitherto obtained.

Suitable organic compounds from which carbon disulphide may be produced in accordance with the present process include the hydrocarbons, organic oxygenated compounds and organic sulphur compounds. Thus, for example, I may use gaseous or liquid compounds of the paraffin and olefine series, still residues, polymers and by-products containing oxygenated or sulphur compounds, natural gas, coke oven gas, cracking gas, ethane, ethylene, propane, propylene, cyclopropane, butane, isobutane, butene-1, butene-2, isobutylene, the primary, secondary, and tertiary pentanes and amylenes.

When the cost permits, I prefer to use such organic compounds as contain at least four carbon atoms in the molecule since I have found that by their use a higher conversion of sulphur to carbon disulphide may be obtained than is obtainable from, for instance, methane. For example, the substitution of butane for methane may raise the converion of sulphur to carbon disulphide by 10%. The process may be applied economically, however, to the production of carbon disulphide from methane, natural gas, coke oven gas, and the like, since these materials are very inexpensive.

Since sulphur is the more expensive of the reactants, the yield of the process may be expressed in terms of the conversion of sulphur to carbon disulphide. In general, the conversion is somewhat dependent upon the temperature employed, being highest in the preferred temperature range of 800–1000° C. The present process easily results in conversions of from 60 to 80 percent, and isolated experiments have shown even higher conversions.

The percent conversion of sulphur to carbon disulphide is somewhat dependent upon the atomic ratio of carbon to sulphur in the gaseous mixture entering the reaction chamber, the conversion increasing as the ratio of carbon to sulphur increases. As the atomic ratio of carbon to sulphur is increased above the stoichiometric amount (1:2), however, the advantage of the increase in conversion is offset by the lowered production rate and the loss of unreacted carbon. The ratio affording maximum economy of the process is, therefore, dependent upon the cost of materials, heat, etc., and should be adjusted for the particular case at hand. Thus, when using a very inexpensive source of carbon the atomic ratio of carbon to sulphur may be economically kept as high as twice the stoichiometric amount. As the ratio approaches 1:4 (the stoichiometric ratio for the reaction $CH_4+4S \rightarrow CS_2+2H_2S$) the conversion drops about 5–10% and ratios below this magnitude are uneconomical. I, therefore, prefer to use atomic ratios of carbon to sulphur between 1:1 and 1:4 (atomic ratios of sulphur to carbon from 1:1 to 4:1 or from one half to twice the stoichiometric amount of sulphur.)

Since the use of pressure tends to lower the yield and is, moreover, expensive, the present process is preferably executed at substantially atmospheric pressure, i. e., under the small pressure required to force the reactants through the catalyst mass at the desired rate. If desired, the reactants may be drawn through the catalyst mass by maintaining the reacted gaseous products under diminished pressure.

The following examples are submitted solely to illustrate a suitable means of executing my process and to show the execellent results afforded by its use and should not be construed as limiting the invention. In these experiments, using methane as one reactant, a measured and controlled flow of methane was preheated to about 600° C. and forced into an unpacked end section of a reaction tube wherein it mixed with a controlled flow of incoming sulphur vapor and the gaseous reactants in the desired proportion, were then passed through a section of the reaction tube filled with the catalyst mass maintained at the desired temperature. The reacted gases issuing from the reaction tube were first cooled by a common water cooled condenser and then passed through another condenser to condense out the carbon disulphide. The uncondensable gases were passed to a gasometer where their volume was measured and a sample taken and analyzed. In all cases, the reaction products were substantially free from uncombined sulphur.

| Example | Catalyst | Temperature, °C. | Contract time, seconds | Sulphur (percent of stoichiometric amount) | Percent conversion (S to $CS_2$) |
|---|---|---|---|---|---|
| I | $Cu_2S$ | 760 | 9 | 112 | 67.3 |
| II | $Ag_2S$ | 960–1000 | 10–11 | 90 | 80.3 |
| III | MnS | 830–850 | 5–6 | 53 | 67 |
| IV | NiS | 760–800 | 5–6 | | 67.7 |
| V | FeS | 805 | 8–9 | 82 | 63 |
| VI | ---do--- | 800 | 0.3–0.4 | 100 | 62.4 |
| VII | ---do--- | 870 | 8–9 | 88 | 70 |

The iron sulphide catalyst was prepared by passing a current of gas over iron pyrites at a temperature of about 500–600° C. until the excess sulphur was completely removed. This left the active FeS catalyst.

The present process, since it requires exceedingly short contact times and can be executed in a continuous manner, is exceptionally economical from the standpoint of production capacity. Laboratory experiments have shown that from 6 to 7 grams of carbon disulphide may be produced per cubic centimeter of free catalytic volume per hour. This, when translated to plant practice, is equivalent to 375 to 438 lbs. of carbon disulphide per cubic foot of free catalytic volume per hour. Moreover, the sulphide catalysts used in the present process are very reactive and require no induction or starting-up periods before the reaction starts. Such induction periods are not only detrimental in that they are wasteful and time-consuming but also because weak acting catalysts which require an induction period become coated with carbon before the reaction starts and, since carbon is practically non-catalytic in the process, these catalysts never reach their maximum efficiency.

Summarizing, it is seen that the main advantage of the present process is the economy with which carbon disulphide may be produced. Since sulphur is less expensive than hydrogen sulphide and since the process may utilize the very cheapest of carbon compounds such as cracking gases, natural gas, still residues, by-products from various processes, etc., the raw material costs in the present process are at an absolute minimum. Several economies may be realized in the operating costs. The moderate temperatures applicable, the fact that, at moderate temperatures, metal equipment may be employed, the economies afforded in condensing the carbon disulphide from the reacted gases, the absence of any necessity for the use of excessive pressures, the absence of "starting-up periods" and the lower hydrogen sulphide concentration in the reacted gases are all factors contributing towards lower operating costs. These advantages, combined with the superior yields and thru-put capacity, constitute the superiority of the process of my invention.

Having described my invention in its preferred embodiment and having given examples illustrating the use and effectiveness of the same, I claim as my invention all that is commensurate with the scope of the subjoined claims.

I claim as my invention:

1. In a process for the production of carbon disulphide by the vapor phase reaction of sulphur with a hydrocarbon, the step of reacting the vaporous mixed reactants at a temperature of from 800° C. to 1000° C. in the presence of nickel sulphide to form a gaseous reaction mixture consisting predominantly of $CS_2$ and $H_2$ substantially devoid of unreacted sulphur.

2. In a process for the production of carbon disulphide by the vapor phase reaction of sulphur with a hydrocarbon, the step of reacting the vaporous mixed reactants at a temperature of from 800° C. to 1000° C. in the presence of a pre-formed iron sulphide to form a gaseous reaction mixture consisting predominantly of $CS_2$ and $H_2$ substantially devoid of unreacted sulphur.

3. In a process for the production of carbon disulphide by the vapor phase reaction of sulphur with a hydrocarbon, the step of reacting the vaporous mixed reactants at a temperature of from 800° C. to 1000° C. in the presence of silver sulphide to form a gaseous reaction mixture consisting predominantly of $CS_2$ and $H_2$ substantially devoid of unreacted sulphur.

4. In a process for the production of carbon disulphide by the vapor phase reaction of sulphur with an organic compound, the step of reacting the vaporous mixed reactants at a temperature of from 800° C. to 1000° C. in the presence of a pre-formed metal sulphide catalyst to form a gaseous reaction mixture consisting predominantly of $CS_2$ and $H_2$ substantially devoid of unreacted sulphur.

5. A process for the production of carbon disulphide and hydrogen which comprises reacting sulphur vapor with the vapor of a volatile hydrocarbon in a ratio of from one-half to two times the stoichiometric amount of sulphur vapor at substantially atmospheric pressure and at a temperature of from 800° C. to 1000° C. for a reaction time from 0.05 to 60 seconds in the presence of a pre-formed catalyst taken from the group consisting of the sulphides of Cu, Ag, Au, Fe, Co, Ni, Ru, Rh, Pd, Os, Ir, Pt, Mo, and Mn, and a catalyst promoter taken from the group consisting of thorium, chromium, and cerium oxides, and removing carbon disulphide from the reacted vapors.

6. A process for the production of carbon disulphide which comprises reacting sulphur vapor with methane in a ratio of from one-half to two times the stoichiometric amount of sulphur vapor at substantially atmospheric pressure at a temperature of from 750° C. to 1100° C. in the presence of a pre-formed catalyst taken from the group consisting of the sulphides of Cu, Ag, Au, Fe, Co, Ni, Ru, Rh, Pd, Os, Ir, Pt, Mo, and Mn, and removing carbon disulphide from the reacted vapors.

7. A process for the production of carbon disulphide which comprises completely reacting sulphur vapor with sufficient vapor of a paraffin hydrocarbon in a ratio from one-half to two times the stoichiometric amount of sulphur vapor at substantially atmospheric pressure and at a temperature of from 750° C. to 1100° C. for a reaction time from 0.05 to 60 seconds in the presence of a catalyst taken from the group consisting of the sulphides of Cu, Ag, Au, Fe, Co, Ni, Ru, Rh, Pd, Os, Ir, Pt, Mo, and Mn, and removing carbon disulphide from the reacted vapors.

8. A process for the production of carbon disulphide which comprises reacting sulphur vapor with the vapor of an organic compound at a temperature of from 750° C. to 1100° C. in the presence of a catalyst taken from the group consisting of the sulphides of Cu, Ag, Au, Fe, Co, Ni, Ru, Rh, Pd, Os, Ir, Pt, Mo, and Mn, and removing as a vaporous reaction product a mixture consisting predominantly of $CS_2$ and $H_2$ substantially devoid of unreacted sulphur.

9. A process for the production of carbon disulphide which comprises reacting sulphur vapor with the vapor of an organic compound at a temperature of from 800° C. to 1000° C. in the presence of a metal sulphide catalyst, and removing as a vaporous reaction product a mixture consisting predominantly of $CS_2$ and $H_2$ substantially devoid of unreacted sulphur.

10. A process for the production of carbon disulphide which comprises reacting sulphur vapor with the vapor of an organic compound in a ratio of from one-half to two times the stoichiometric amount of sulphur vapor at a temperature of from 750° C. to 1100° C. in the presence of a metal sulphide catalyst, and removing carbon disulphide from the reacted vapors.

11. A process for the production of carbon disulphide which comprises reacting sulphur vapor with the vapor of a hydrocarbon containing at least four carbon atoms in the molecule at a temperature of from 750° C. to 1100° C. in the presence of a metal sulphide catalyst, and removing as a vaporous reaction product a mixture consisting predominantly of $CS_2$ and $H_2$ substantially devoid of unreacted sulphur.

12. A process for the production of carbon disulphide which comprises reacting sulphur vapor with the vapor of a hydrocarbon at substantially atmospheric pressure and at a temperature of from 750° C. to 1100° C. in the presence of a metal sulphide catalyst, and removing as a vaporous reaction product a mixture consisting predominantly of $CS_2$ and $H_2$ substantially devoid of unreacted sulphur.

13. A process for the production of carbon disulphide which comprises reacting sulphur vapor with the vapor of an organic compound at a temperature of from 750° C. to 1100° C. in the presence of a metal sulphide catalyst and a catalyst promoter taken from the group consisting of thorium, chromium, and cerium oxides, and removing carbon disulphide from the reacted vapors.

14. A process for the production of carbon disulphide which comprises reacting sulphur vapor with the vapor of an organic compound at a temperature of from 750° C. to 1100° C. for a reaction time from 0.05 to 60 seconds in the presence of a metal sulphide catalyst, and removing as a vaporous reaction product a mixture consisting predominantly of $CS_2$ and $H_2$ substantially devoid of unreacted sulphur.

15. A process for the production of carbon disulphide which comprises reacting sulphur vapor with the vapor of an organic compound at a temperature of from 750° C. to 1100° C. in the presence of a metal sulphide catalyst for a reaction time less than 20 seconds, and removing as a vaporous reaction product a mixture consisting predominantly of $CS_2$ and $H_2$ substantially devoid of unreacted sulphur.

16. A process for the production of carbon disulphide which comprises reacting sulphur vapor with the vapor of an organic compound at a temperature of from 750° C. to 1100° C. in the presence of a metal sulphide catalyst, and removing as a vaporous reaction product a mixture consisting predominantly of $CS_2$ and $H_2$ substantially devoid of unreacted sulphur.

MARTIN DE SIMÓ.